(No Model.) 2 Sheets—Sheet 1.
G. H. STOUT.
ELECTRODE FOR SECONDARY BATTERIES.
No. 392,080. Patented Oct. 30, 1888.
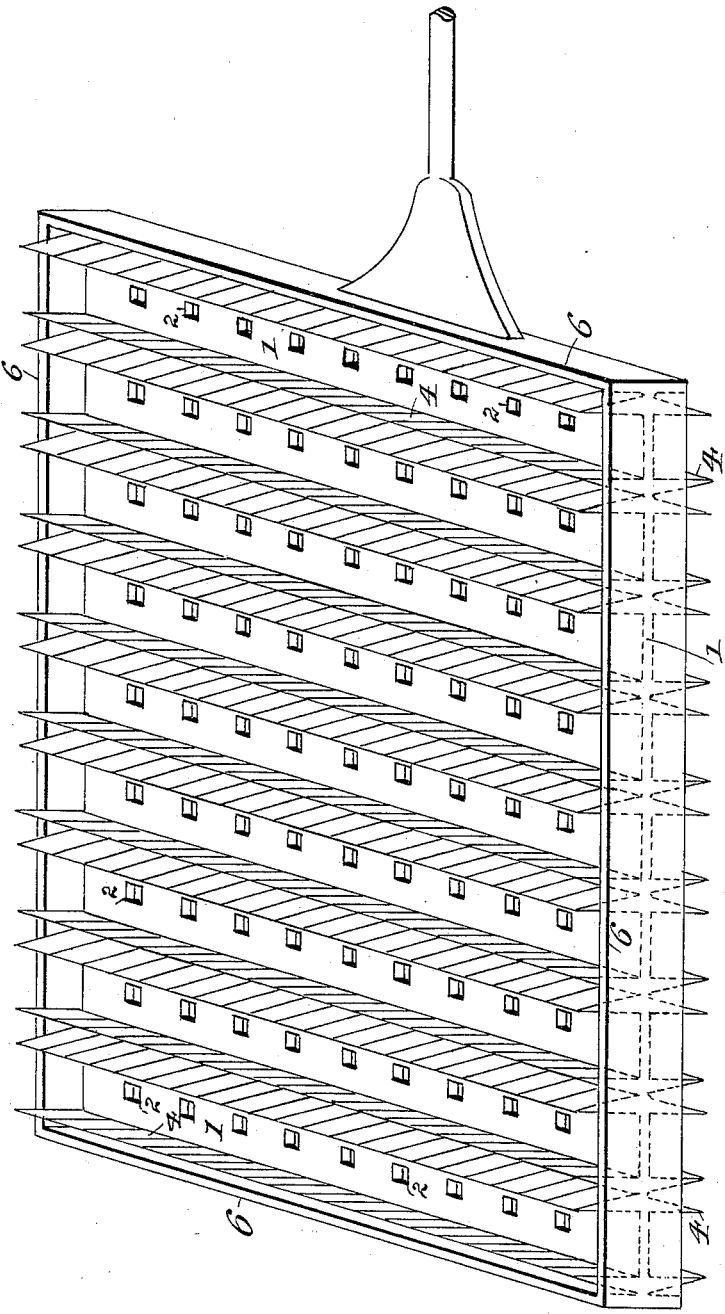

(No Model.) 2 Sheets—Sheet 2.
G. H. STOUT.
ELECTRODE FOR SECONDARY BATTERIES.
No. 392,080. Patented Oct. 30, 1888.
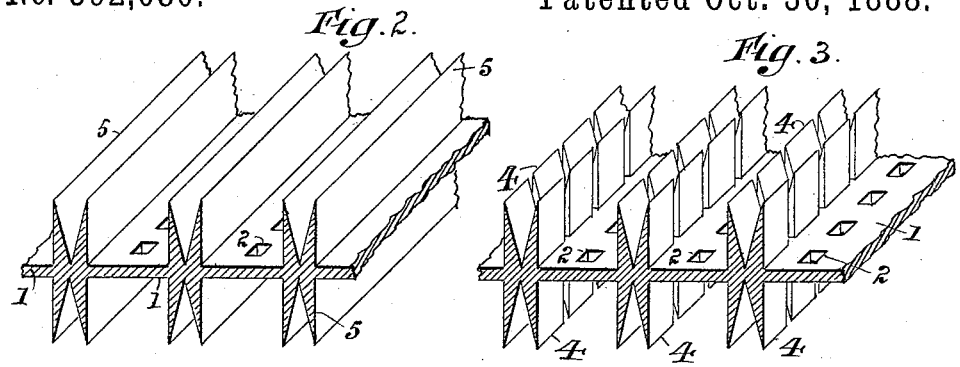
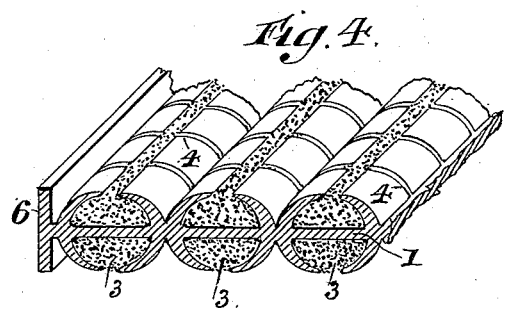
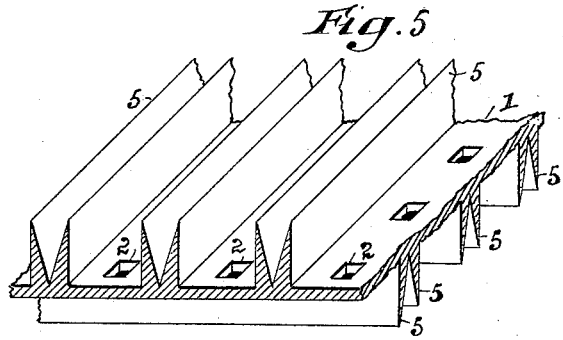

UNITED STATES PATENT OFFICE.

GEORGE H. STOUT, OF NEW YORK, N. Y.

ELECTRODE FOR SECONDARY BATTERIES.

SPECIFICATION forming part of Letters Patent No. 392,080, dated October 30, 1888.

Application filed October 15, 1887. Serial No. 252,450. (No model.)

*To all whom it may concern:*

Be it known that I, GEORGE H. STOUT, of the city, county, and State of New York, have invented a new and useful Improvement in Electrodes for Storage-Batteries, of which the following is a specification.

My invention relates particularly to improvements in the electrodes of secondary or storage batteries of that type in which the active material, or material adapted to become active, is held in position in a grid, plate, or support; and its object is to provide such a support as will hold the material more securely in place.

To this end it consists in the novel form of electrode hereinafter described, but particularly pointed out in the claims which follow this specification.

My invention will be fully understood by referring to the accompanying drawings, which clearly and exactly illustrate it, and in which—

Figure 1 is a perspective view of my improved electrode, minus the active material. Figs. 2 and 3 are partial detail perspective views of the same, the former showing the retaining-ribs as extending across the face of the electrode. Fig. 4 is a similar partial detail perspective view of the same, showing the active material in place. Fig. 5 is a detail perspective view of a portion of an equivalent modified form, in which retaining strips or ribs on the opposite faces are located at right angles to each other.

Referring to the drawings in detail, 6 represents the outer rim of the electrode, which is made of lead or any analogous material of which it is usual to construct electrodes for storage-batteries. This rim extends entirely around the plate, and is integral with the back 1 of the plate, as are also the retaining lips or ribs 4 4, all of said parts being made at a single operation, either by casting or under pressure, in a manner well known to those skilled in the art.

2 2 are perforations in the back of the plate, which are also made during the same operation.

In Fig. 4 I have shown the active material, 3 3, in place, the lips or ribs having been bent into position after said material was pressed or otherwise applied in any desired manner.

It is a well-known fact to those skilled in the construction and use of storage-batteries that during the process of charging and using the gases created between the active material and the supporting or sustaining portions of the frame cause said material to expand and contract. There results from this action a disintegration of the active material, and the plates "strip off" and "buckle." By my arrangement above described this objectionable feature is very materially, if not entirely, avoided.

By reason of the perforations in the plate, the active material is united from the opposite sides, and those portions of the retaining-frame constituting the back support for material are entirely covered from the action of the charging-current. The projecting lips or ribs are of such flexible nature that they readily expand under action of the expanding influence, as will be understood on examining Fig. 4. The preferred form is shown in Figs. 1, 3, and 4, wherein the ribs or lips are divided into sections, thereby rendering them more sensitive to the expansive effects.

I am aware that it is broadly old to construct a storage-battery electrode which has upturned shelves or ribs on its opposite faces integral with the sustaining or back plate, and to inclose the active material between said shelves or ribs, and I make no claim to this feature, broadly. I believe, however, that it is new with me to construct such an electrode as I have above disclaimed, but provided with perforations extending through the plate, by the combined action of which the active material, or material adapted to become active, is much more firmly held in place.

Having thus described my invention, what I claim, and desire to secure by Letters Patent, is—

1. An electrode for a secondary or storage battery, consisting of a perforated sustaining plate or support having expansible projecting shelves or ribs extending across its face, and inclosing the active material in the perforations and between the shelves and the sustaining-plate, substantially as described.

2. An electrode for a secondary or storage battery, consisting of a perforated plate having expansible projecting lips or ribs extending across its face, said lips or ribs being divided into sections, and inclosing the active material in the perforations and between the lips or ribs and the plate, as shown and described.

3. An electrode for a secondary or storage battery, consisting of a perforated plate having retaining ribs or shelves on its opposite faces, said ribs or shelves being divided into sections, in combination with active material, or material adapted to become active, held in place between said ribs and the plate and in the perforations, substantially as described.

4. An electrode for a secondary or storage battery, consisting of a perforated retaining-plate having projecting strips or ribs on its opposite faces and an external stiffening-rim around its edge, the active material being held in place in the perforations and between the strips or ribs and the plate, substantially as described.

5. An electrode for a secondary or storage battery, consisting of a perforated retaining-plate for sustaining the active material, said plate having parallel rows of retaining strips or shelves bent inward toward each other in pairs, the active material being held in place by the combined action of the shelves and the ledges made by the perforations, substantially as described.

6. An electrode for a secondary or storage battery, consisting of a perforated plate with expansible retaining lips, ribs, or shelves which are located on opposite faces of the plate in pairs and encompass the perforations and the active material, holding the latter in place, substantially as described.

In testimony whereof I have hereunto subscribed my name.

GEO. H. STOUT.

Witnesses:
GEO. WADMAN,
EDWARD W. CADY.